(12) United States Patent
Buchelli et al.

(10) Patent No.: US 7,786,227 B2
(45) Date of Patent: Aug. 31, 2010

(54) MONOMER CONCENTRATION PREDICTION AND CONTROL IN A POLYMERIZATION PROCESS

(75) Inventors: Alberto Buchelli, Houston, TX (US); Steven P. Haynie, Huffman, TX (US); Bruce A. Wicker, Jr., Pearland, TX (US)

(73) Assignee: Equistar Chemicals, LP, Houston, TX (US)

( * ) Notice: Subject to any disclaimer, the term of this patent is extended or adjusted under 35 U.S.C. 154(b) by 549 days.

(21) Appl. No.: 11/890,726

(22) Filed: Aug. 7, 2007

(65) Prior Publication Data
US 2009/0043054 A1 Feb. 12, 2009

(51) Int. Cl.
*C08F 2/00* (2006.01)
*C08F 210/00* (2006.01)
*C08F 110/02* (2006.01)

(52) U.S. Cl. .......................... 526/59; 526/61; 526/348; 526/352

(58) Field of Classification Search .................. 526/59, 526/61, 348, 352
See application file for complete search history.

(56) References Cited

U.S. PATENT DOCUMENTS

| 3,257,363 A | 6/1966 | Miller et al. |
| 3,998,995 A | 12/1976 | Buss et al. |
| 2004/0083028 A1* | 4/2004 | Vaidyanathan et al. ...... 700/269 |

FOREIGN PATENT DOCUMENTS

WO   WO 2005/049663   2/2005

OTHER PUBLICATIONS

Sang-Seop Na, Hyun-Ku Rhee, "An experimental study for property control in a continuous styrene polymerization reactor using a polynomial ARMA model," *Chemical Engineering Science*, 57 (2002), pp. 1165-1173, Elsevier.

\* cited by examiner

*Primary Examiner*—William K Cheung
(74) *Attorney, Agent, or Firm*—Yunazhang Han

(57) ABSTRACT

A method for the control of a polymerization process, which method employs the combination of a densitometer measurement of the polymerization reaction mixture and a quadratic computer model.

2 Claims, 3 Drawing Sheets

MONOMER CONCENTRATION PREDICTION AND CONTROL IN A POLYMERIZATION PROCESS

BACKGROUND OF THE INVENTION

1. Field of the Invention

This invention relates to a process for the operation of a polymerization reactor for producing polymers. More particularly, this invention relates to a method for the control of monomer concentration in a polymerization process to provide improved control of at least one of polymer production rate, polymer melt index, and density control.

2. Description of the Prior Art

Although, for sake of clarity and brevity, this invention will be described in respect of the slurry phase polymerization of ethylene to produce high density polyethylene (HDPE), it is to be understood that this invention applies generally to polymerization processes in which a process fluid desirably flows in a substantially uniform manner, and in which a densitometer is employed. For example, this invention can be applied in polymerization systems wherein either slurry or solution polymerization of at least one monomer takes place.

Heretofore, HDPE has been formed by polymerizing ethylene while dissolved in a solvent such as isobutane using a silica-supported chromium/aluminum catalyst. Tri-ethyl borane (TEB) has been employed for various reasons, one of which was to form hexene, a co-monomer, in situ in the reaction mixture. Ethylene and molecular hydrogen (hydrogen) are added to form a final reaction mixture. This reaction mixture is circulated in a continuous stream (loop) in the reactor system, and a slurry is formed which is composed of this mixture and suspended solid polyethylene particles (powder). A slip stream of this slurry is withdrawn and solid polyethylene product recovered therefrom. The reaction is carried out at a temperature of from about 205 to about 225 degrees Fahrenheit (F.) and a pressure of from about 600 to about 700 psig inside a loop-type reactor that can be, for example, about 24" in inside diameter, and about 728 feet long. Inside the reactor, the reaction slurry is circulated at a high velocity, e.g., about 35 feet per second, to prevent settling out of the polymer particles in the reactor.

The reaction product is withdrawn from the reactor as a slurry of polyethylene powder in liquid isobutane. In order to reduce the amount of isobutane that must be recycled through the purification section, the slurry is concentrated by the use of hydroclones after it leaves the reactor. Hot recycle water is added to the polymer slurry coming out of the hydroclones, and the combined streams flow into a high-pressure slurry flash drum where the isobutane and unreacted ethylene are removed overhead from the top of the drum, and the water and polymer are removed from the bottom of the same vessel. A slip stream taken from the over head gas from the high pressure separator is taken to a conventional gas chromatograph where a sample of the gas is periodically analyzed. This periodic analysis takes from 2 to 3 minutes per analysis cycle and typically has a 7 to 10 minute delay from real time. The composition of this gas sample gives an indication of the actual concentration of ethylene gas inside the slurry loop reactor.

Typically, the ethylene concentration is controlled to about 6 percent by mole (mole %), but, depending on the type of product made, it can be in the range from about 2 to about 8 mole %. The TEB concentration is controlled in the range from about 0.4 to about 0.7 ppm. Hydrogen is used to control chain branching. Typically, the hydrogen concentration in the reactor is in the range from about 0.80 to 1.2 mole %.

Processing conditions in the reactor can be varied to influence the polymers melt index, molecular weight distribution, and density. Temperature is an important variable in the polymerization process. Depending on the type of polymer resin made, reactor temperature is maintained at the desired level by circulating tempered water through jackets carried by the reactor. Around the reactor loop, a number of conventional thermocouples or resistance temperature detectors (RTD's) are employed for measurement of the temperature of the reaction mixture. Reactor temperature is maintained at the desired level, in part, by circulating tempered water through the reactor's jackets. The amount of ethylene fed to the reactor directly affects the temperature of the reaction.

In the reactor loop there is a conventional analyzer that measures the density of the slurry circulating in the reactor. This instrument continuously measures the density of the slurry which is indicative of the polymer solids concentration in the reactor. The solids concentration is typically maintained at a desired concentration, e.g., from about 37 to about 44% by weight (wt. %). This concentration can be controlled by adjusting the isobutane feed rate to the reactor.

The combined stream of reactor hydroclone bottom flow and hot recycle water is flashed into a high pressure slurry drum that is maintained at a pressure of from about 220 to about 230 psig. Most of the hydrocarbons are vaporized by the hot water and are recovered from the overhead stream of the drum by way of a cyclone separator. This cyclone separates and removes polymer particles from the overhead gas stream. Agitators hold the solid polymer particles in suspension in the water. The bottoms output of the high pressure drum is sent to a low pressure slurry drum which is maintained at a pressure below that of the high pressure slurry drum, e.g., about 1.5 psig. The slurry is thickened in the low pressure slurry drum, and then removed from the agitated section of the drum and pumped to centrifuges. Water from the centrifuges is discharged to the recycle water drum and then pumped to the recycle water separator. A recycle water separator is used to provide residence time to allow finely divided polymer powder fines to disengage from the recycle water. Solid polymer particles from the centrifuges are passed into a fluid bed dryer. After the fluid bed dryer, the dried polymer is conveyed to powder storage silos or a mixer feed hopper.

The melt index of the polymer in the reactor is controlled mainly by the reaction temperature and ethylene concentration in the reaction mixture. Polymer density is controlled by the concentration of the TEB and/or hexene present in the polymerization reaction mixture.

Process variables in the reactor can change suddenly and their effect on the ethylene concentration in the reactor may not be picked-up by the aforesaid gas chromatograph since that chromatograph has a 7 to 10 minute dead time (feedback delay). This delayed ethylene concentration analysis has a good probability from time to time of causing less than desired reactor production and polymer property control, especially during un-steady state processing conditions. Accordingly, there is a need for better monomer concentration analysis and control in polymerization processes such as the HDPE process aforesaid.

Pursuant to this invention, real time, on-line prediction and control of monomer concentration inside a polymerization reactor is substantially improved by using certain process instrumentation coupled with mathematical models to provide more consistent reactor control. Pursuant to this invention, a system that employs a densitometer measurement and a mathematical model for monomer concentration prediction reduces the aforesaid time delay by several orders of magnitude, and provides a more optimal monomer feed rate control.

SUMMARY OF THE INVENTION

In accordance with this invention, a densitometer measurement and a quadratic mathematical model are coupled into an algorithm whose output value can be used to closely control the monomer concentration in a polymerization reactor under varying steady and unsteady state situations. This combination provides, in real time, a more optimized polymer production rate and improved polymer properties such as density and melt index.

DETAILED DESCRIPTION OF THE INVENTION

Figure 1:
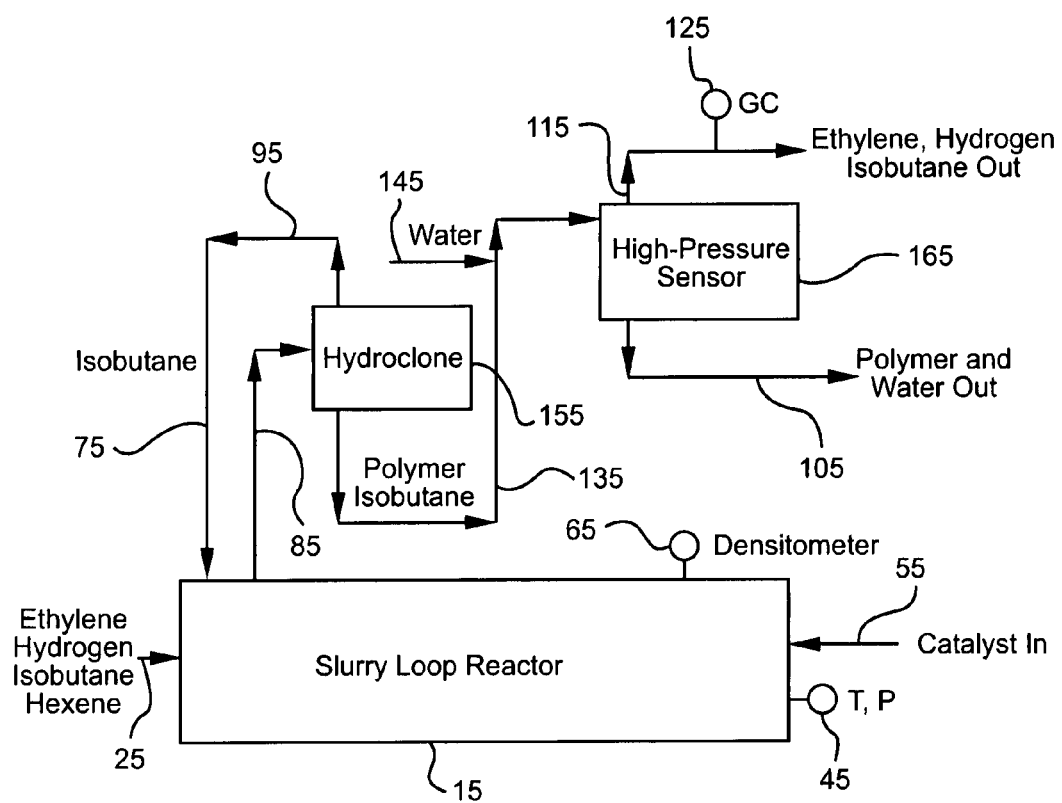
FIG. 1 shows a typical slurry loop reactor process flow diagram.

FIG. 1 shows an HDPE slurry polymerization process. A mixture 25 of ethylene, hydrogen, hexene, and isobutane enters horizontal loop reactor 15 and joins the reaction mixture slurry that is continuously circulated within reactor 15. The slurry is circulated at a velocity sufficient to prevent settling out of the solid polymer particles inside reactor 15. Catalyst 55 is also fed to the reactor to drive the polymerization reaction. The heat of polymerization is removed by water that circulates through jackets (not shown) that are mounted on reactor 15.

A conventional, commercially available, on-line densitometer 65 such as a K-RAY Model 3680 that is marketed by Thermo Fisher Scientific, Process Instruments Division, Sugar Land, Tex., is used to provide process information on the density of the slurry at short time intervals, e.g., from about every 2 to about every 5 seconds. Densitometer 65 can employ gamma beam attenuation for essentially real time read out from a scintillation-based detector. The pulses from the scintillation-detector are directly related to the intensity of the gamma ray energy received. The pulses are conditioned, counted, and scaled by a built in processor to provide process fluid density read outs with an accuracy up to plus or minus 0.0001 grams per cubic centimeter depending on the field calibration.

A slip stream 85 is removed from reactor 15 and sent to the inlet of a centrifugal separator (hydroclone) 155 where a mixture 135 of solid polymer particles, isobutane, ethylene and hydrogen is centrifugally separated to leave a main isobutane stream 95. The lighter isobutane in stream (line) 95 leaves hydroclone 155 and is returned to reactor 15 via line 75 where it rejoins the circulating reaction slurry in reactor 15. Water 145 is mixed with stream 135 and passed into high pressure separator 165. A polymer and water mixture 105 is removed from separator 165 and separately processed (not shown) as described hereinabove to recover the solid polymer therein as a product of the process. A gaseous mixture 115 of unreacted ethylene, hydrogen and some isobutane is removed as overhead from separator 165. An on-line gas chromatograph 125 is operatively connected to line 115 to measure the mole percent of ethylene and hydrogen at this outlet of separator 165. These are the concentration measurements that have a lag-time of between 7 to 10 minutes.

Figure 2:
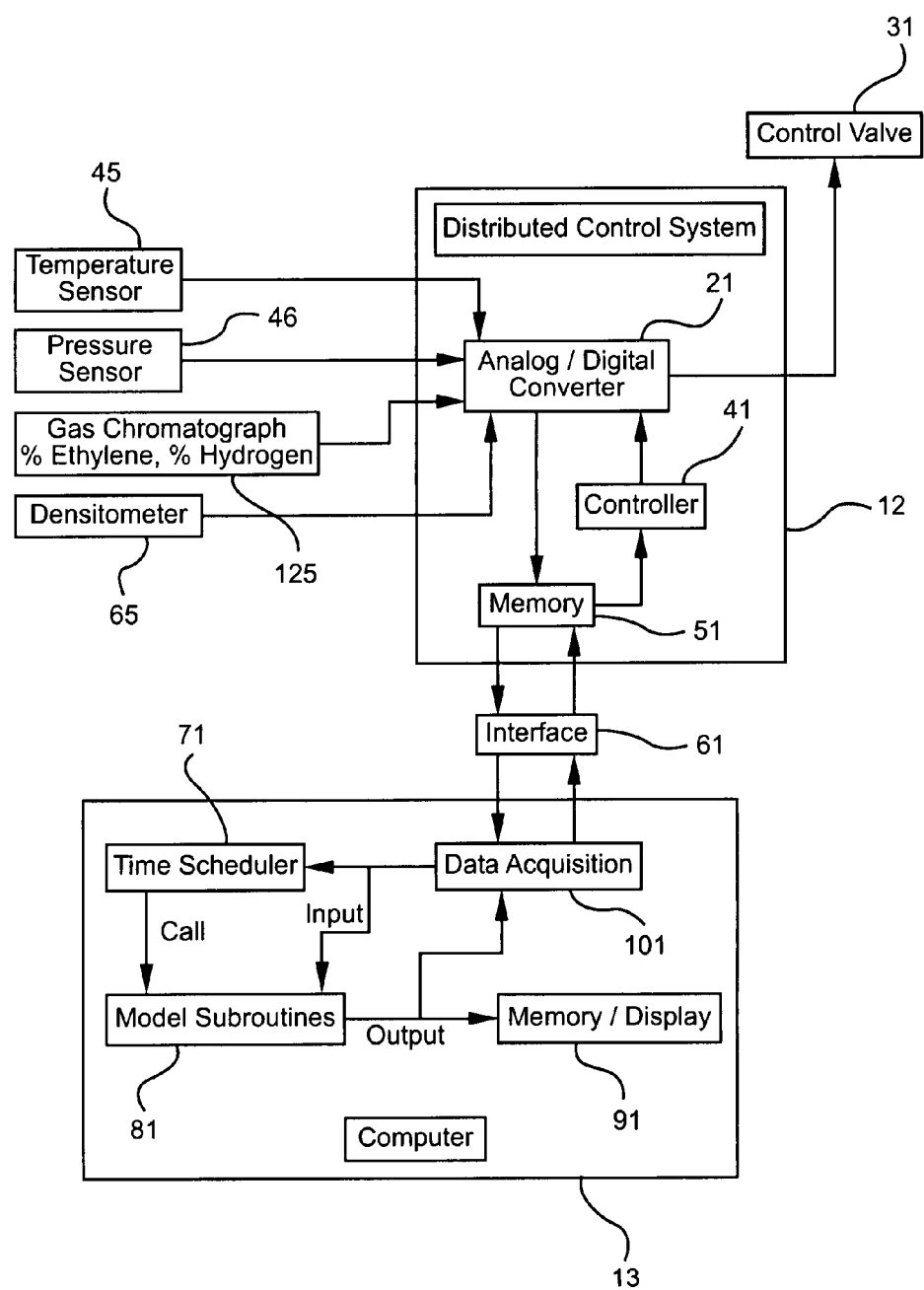
FIG. 2 shows a computer hardware block diagram and logical process information flow diagram useful in this invention.

FIG. 2 shows a block diagram of the computer hardware and logical process information flow pursuant to this invention. Typically, measured values of reaction temperature from at least one RTD, reaction pressure from at least one remote sealed pressure transmitter such as a Rosemount model 3051, output of ethylene in mole % and hydrogen in mole % as measured by the gas chromatograph 125, and slurry density in reactor 15 as measured by densitometer 65 are brought into an analog/digital converter 21. Converter 21 is in a conventional, commercially available, distributed control system (DCS) 12, such as an Emerson Process System. These process signals are stored in memory, 51, and, through conventional Emerson interface server 61, are translated and transferred to conventional, commercially available server 13, e.g., a Compaq G3 server, and into data acquisition unit 101. From here the data is transferred by time scheduler 71 which periodically causes the operation of the model subroutines 81.

Figure 3:
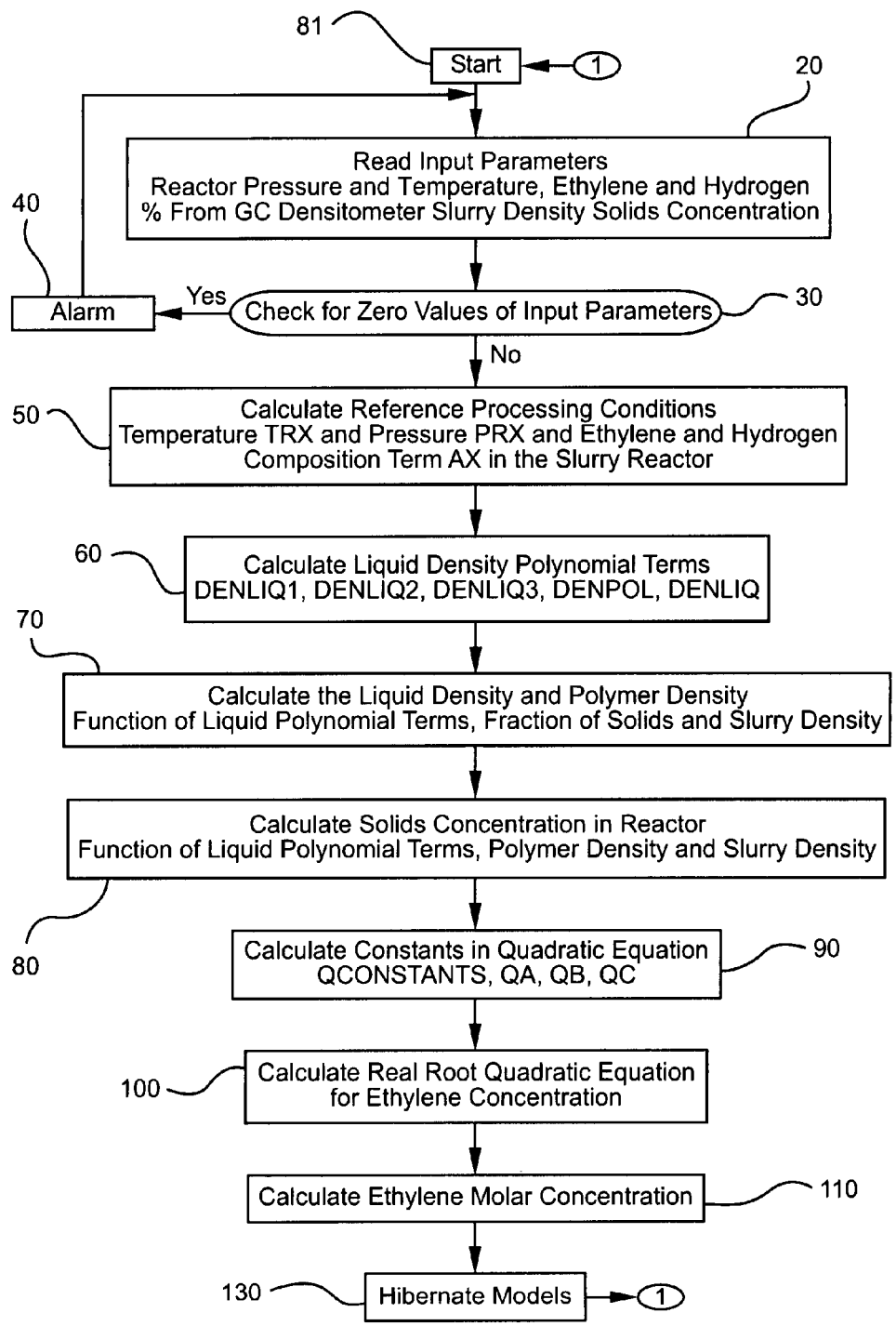
FIG. 3 shows a flow chart of logical software calculation steps useful in the hardware of FIG. 2.

Subroutine unit 81 is where the calculations are performed pursuant to this invention. Operation of unit 81 is periodically initiated by subroutine model 130 (FIG. 3). The output of model subroutines unit 81 is displayed and stored in memory 91. The calculated ethylene concentration value of the model is transferred back into the data acquisition unit 101, through interface 61, and downloaded into memory 51 of DCS 12. From memory 51, the calculated values of the manipulated variables such as ethylene flow to the reactor and catalyst flow to the reactor are passed to their respective controllers 41, and a signal sent from converter 21 to their respective control valves on reactor 15. These control valves are collectively shown in FIG. 2 at 31. In this fashion, optimal control of polymer production rate and polymer properties such as density and melt index is obtained.

FIG. 3 presents a flowchart showing the software calculation steps of this invention. The calculation process of this invention starts in software model unit 81. Reactor pressure, reactor temperature, ethylene and hydrogen concentration in mole % as measured by the gas chromatograph 125, and slurry density as measured by densitometer 65. The next step 30 checks for zero values of the foregoing input parameters, and determines if adequate data is available to perform the calculations in step 50, or to activate alarm 40 and return to starting point 20 to read new values of input parameters or to freeze the calculation step temporarily until the next calculation cycle.

The first two calculations are performed in step 50. They determine the relative temperature (F.), Equation (1), and relative pressure (Psia), Equation (2), in the slurry reactor according to the following equations:

$$TRX = T - 200 \qquad \text{Equation (1)}$$

$$PRX = P - 585.3 \qquad \text{Equation (2)}$$

A composition term (AX) using ethylene (% mole) and hydrogen (% mole) is also calculated in step 50 according to the following equation:

$$AX = \frac{\frac{C_2^=}{2} + \frac{H_2}{28.57}}{100} \qquad \text{Equation (3)}$$

TRX, PRX, and AX are employed in solving various equations set forth hereinafter.

Calculation of liquid density polynomial terms proceeds in step 60 according to the following equations (4) through (6), the "*" indicating a multiplication function:

$$DENLIQ1 = a_1 + a_2 TRX + a_3 AX + a_4 PRX + a_5 TRX*AX + a_6 TRX*PRX*AX + a_7 TRX^2 \quad \text{Equation (4)}$$

$$DENLIQ2 = DENLIQ1 + b_1 AX^2 + b_2 TRX*AX^2 + b_3 AX^2 PRX \quad \text{Equation (5)}$$

$$DENLIQ3 = DENLIQ2 + c_1 TRX^3 \quad \text{Equation (6)}$$

DENLIQ3 is used in solving Equation (9) below.

The polymer density is calculated in step 70 according to the following equation:

$$DENPOL = d_1 + d_2 TRX \quad \text{Equation (7)}$$

DENPOL is used in Equations (8) and (9) below.

The liquid density is calculated in step 70 according to the following equation:

$$DENLIQ = \frac{100*slurrydensity*DENPOL - FSOLIDS*slurrydensity*DENPOL}{100*DENPOL - FSOLIDS*slurrydensity} \quad \text{Equation (8)}$$

In Equation (8) FSOLIDS is the filtered solids concentration. The filter solids concentration is obtained by averaging the QSOLIDS concentration calculated from Equation (13) below over a period time around 15 minutes.

DENLIQ is used in Equation (13) below.

The solids concentration is calculated in step 80 according to the following equation:

$$QSOLIDS = \frac{100*DENPOL*(slurrydensity - DELINQ3)}{Slurrydensity*(DENPOL - DELINQ3)} \quad \text{Equation (9)}$$

The calculation of the constants in the quadratic equation proceeds in step 90 according to the following equations:

$$QCONSTANTS = e_1 + e_2 TRX + e_3 PRX + e_4 TRX^2 + e_5 TRX^3 \quad \text{Equation (10)}$$

$$QA = f_1 + f_2 TRX + f_3 PRX \quad \text{Equation (11)}$$

$$QB = g_1 + g_2 TRX + g_3 TRX*PRX \quad \text{Equation (12)}$$

$$QC = QCONSTANTS - DENLIQ \quad \text{Equation (13)}$$

The parameters $a_i$, $b_i$, $c_i$, $d_i$, $e_i$, $f_i$, $g_i$ are constants in each one of the equations shown above and their numerical values are shown in the Table below.

Calculation of the real root of a quadratic equation for determination of the ethylene concentration X (mass), see Equation (15), proceeds in step 100 according to the following equations:

$$QA*(X^2) + QB*X + QC = 0 \quad \text{Equation (14)}$$

The equation above has a real solution that is expressed as:

$$X = \frac{-QB - \sqrt{(QB)^2 - 4*QA*QC}}{2*QA} \quad \text{Equation (15)}$$

Finally, the concentration of ethylene (mole %) in the slurry loop reactor is calculated in step 110 according to the following equation:

$$C_2^= = 2\left[100*X - \frac{H_2}{28.57}\right] \quad \text{Equation (16)}$$

After completion of the foregoing calculations, the calculated results are hibernated (temporarily stored) in step 130 until the next cycle when the foregoing calculation procedure is repeated.

The aforementioned calculation scheme shown in equations (1) through (16) provides a capability to implement a more consistent (less varied) control of the ethylene concentration in reactor 15 without the magnitude of time lags or delays as were experienced by the prior art by relying solely on the results of gas chromatograph 125. For example, with the prior art process described hereinabove, the lag time of 7 to 10 minutes mentioned hereinabove is reduced to a lag time of from about 30 to about 60 seconds.

By controlling the ethylene feed rate to the reactor every 30 to 60 seconds, the DCS can then more closely control the reactor temperature which, in turn, provides excellent control of the solids concentration in the slurry inside the reactor. In addition, the continuous feedback to the DCS of ethylene concentration on cycles of no more than a minute enables the DCS to more closely control the density and melt index of the polymer product during both steady state reactor behavior and unsteady-state reactor behavior during product transitions. By this invention, product transitions can be improved, thereby allowing for optimization of product properties and plant capacity.

The aforementioned calculation scheme is not limited to horizontal, slurry loop polymerization reactor processes. It can be applied as well to vertical loop polymerization reactor processes.

| VALUES OF PARAMETERS IN EQUATIONS (4, 5, 6, 7, 10, 11, 12) | | | | | | |
|---|---|---|---|---|---|---|
| I | ai | bi | ci | di | ei | fi | gi |
| 1 | 0.4633 | −0.68998 | −0.0000002 | 0.927 | 0.4633 | −0.68998 | −0.36508 |
| 2 | −0.0008884 | −0.0300355 | | 0.000307 | −0.0008884 | −0.030055 | −0.0036994 |
| 3 | −0.36508 | 0.0033084 | | | 0.0000462 | 0.0033084 | 0.0000239 |
| 4 | 0.0000462 | | | | −0.0000082 | | |
| 5 | −0.0036994 | | | | −0.0000002 | | |
| 6 | 0.0000238 | | | | | | |
| 7 | −0.0000082 | | | | | | |

We claim:

1. In an ethylene monomer slurry polymerization process for forming solid high density polyethylene polymer particles in a reaction mixture of ethylene monomer, ethylene polymerization catalyst, and hydrogen in liquid solvent and controlling the physical properties of said polyethylene polymer particles utilizing at least one process measurement taken from said polymerization process, said polymerization process employing a densitometer to obtain the density of said polymerization reaction mixture containing said ethylene monomer, the improvement comprising:

(a) measuring at least one pressure and at least one temperature in said reaction mixture, calculating the average concentration of solids in said reaction mixture, measuring the density of said reaction mixture with said densitometer, measuring said ethylene monomer concentration, each of said measurements providing an analog signal output, and converting said analog signals to digital signals;

(b) providing a digital computer with a data base that includes said digital signals obtained from step (a);

(c) programming said digital computer according to a densitometer quadratic concentration model having constants and a real root for determining the ethylene monomer concentration in said reaction mixture, said densitometer quadratic concentration model comprising (1) a reference temperature calculated according to the equation TRX=measured temperature T minus 200

(2) a reference pressure is calculated according to the equation

PRX=measured pressure P minus 585.3

(3) a composition term using ethylene in mole % and hydrogen in mole % calculated using the equation, $$AX = \frac{\frac{C_2^=}{2} + \frac{H_2}{28.57}}{100}$$

(4) reaction mixture liquid density polynomial terms a calculated using the equation, $DENLIQ1 = a_1 + a_2 TRX + a_3 AX + a_4 PRX + a_5 TRX*AX + a_6 TRX*PRX*AX + a_7 TRX^2$ $DENLIQ2 = DENLIQ1 + b_1 AX^2 + b_2 TRX*AX^2 + b_3 AX^2 PRX$  $DENLIQ3 = DENLIQ2 + c_1 TRX^3$ (5) a polyethylene polymer particle density term calculated using the equation, $DENPOL = d_1 + d_2 TRX$ (6) a reaction mixture liquid density term calculated using the equation, $$DENLIQ = \frac{100*slurrydensity*DENPOL - FSOLIDS*slurrydensity*DENPOL}{100*DENPOL - FSOLIDS*slurrydensity}$$

(7) a reaction mixture polyethylene polymer particle solids concentration term calculated using the equation, $$QSOLIDS = \frac{100*DENPOL*(slurrydensity - DENLIQ3)}{Slurrydensity*(DENPOL - DENLIQ3)}$$

(8) said constants in said quadratic concentration model calculated are calculated according to the equations, $QCONSTANTS = e_1 + e_2 TRX + e_3 PRX + e_4 TRX^2 + e_5 TRX^3$ $QA = f_1 + f_2 TRX + f_3 PRX$ $QB = g_1 + g_2 TRX + g_3 TRX*PRX$ $QC = QCONSTANTS - DENLIQ$ (9) said real root in said quadratic concentration model for the determination of the ethylene monomer concentration in said reaction mixture is calculated using the equations, $QA*(X^2) + QB*X + QC = 0$ $$X = \frac{-QB - \sqrt{(QB)^2 - 4*QA*QC}}{2*QA}$$

and

(10) the concentration of ethylene monomer in said reaction mixture is calculated using the equation, $$C_2^= = 2\left[100*X - \frac{H_2}{28.57}\right]$$

wherein "*" indicates a multiplication function, and the parameters $a_i$, $b_i$, $c_i$, $d_i$, $e_i$, $f_i$, $g_i$ are constants in each one of the equations shown above and their numerical values are

| a | b | C | d |
|---|---|---|---|
| 0.4633 | −0.68998 | −0.0000002 | 0.927 |
| −0.0008884 | −0.0300355 | | 0.000307 |
| −0.36508 | 0.0033084 | | |
| 0.0000462 | | | |
| −0.0036994 | | | |
| 0.0000238 | | | |
| −0.0000082 | | | |

| E | f | g |
|---|---|---|
| 0.4633 | −0.68998 | −0.36508 |
| −0.0008884 | −0.030055 | −0.0036994 |
| 0.0000462 | 0.0033084 | 0.0000239 |
| −0.0000082 | | |
| −0.0000002 | | |

(d) calculating the physical properties comprising polyethylene polymer particle density, reaction mixture density, polyethylene solids concentration, and ethylene monomer concentration using the model of step (c) together with the database of step (b);

(e) using said calculated physical properties of step (d) as a predictor of at least one physical property of said polyethylene polymer particles produced by said polymerization process; and (f) controlling said polymerization process based on said calculated physical properties.

2. The method of claim 1 where said predicted physical property is at least one of density and melt index.

* * * * *